US012661630B2

(12) United States Patent
Marre et al.

(10) Patent No.: US 12,661,630 B2
(45) Date of Patent: Jun. 23, 2026

(54) SAPPHIRE MICROREACTORS

(71) Applicants: Centre National de la Recherche Scientifique, Paris (FR); Centre National d'Études Spatiales, Paris (FR)

(72) Inventors: Samuel Marre, Pessac (FR); Carole Lecoutre, Cestas (FR); Yves Garrabos, Pessac (FR); Cyrielle Fauveau, Pessac (FR); Anaïs Cario, Bègles (FR); Olivier Nguyen, Pessac (FR)

(73) Assignees: Centre National de la Recherche Scientifique, Paris (FR); Centre National d'Études Spatiales, Paris (FR)

( * ) Notice: Subject to any disclaimer, the term of this patent is extended or adjusted under 35 U.S.C. 154(b) by 731 days.

(21) Appl. No.: 17/995,688

(22) PCT Filed: Apr. 7, 2021

(86) PCT No.: PCT/FR2021/050604
§ 371 (c)(1),
(2) Date: Dec. 21, 2022

(87) PCT Pub. No.: WO2021/205115
PCT Pub. Date: Oct. 14, 2021

(65) Prior Publication Data
US 2023/0133449 A1     May 4, 2023

(30) Foreign Application Priority Data
Apr. 7, 2020     (FR) ...................................... 2003453

(51) Int. Cl.
B01J 19/00     (2006.01)

(52) U.S. Cl.
CPC .. B01J 19/0093 (2013.01); B01J 2219/00783 (2013.01); B01J 2219/00808 (2013.01);
(Continued)

(58) Field of Classification Search
CPC .......... B01J 19/0093; B01J 2219/00783; B01J 2219/00808; B01J 2219/00819;
(Continued)

(56) References Cited

U.S. PATENT DOCUMENTS

2004/0043506 A1     3/2004   Horst et al.
2007/0278100 A1    12/2007   Pu et al.
(Continued)

OTHER PUBLICATIONS

Crystal Systems Inc, "Sapphire: Optical Properties" (Year: 2007).*
(Continued)

*Primary Examiner* — Huy Tram Nguyen
(74) *Attorney, Agent, or Firm* — ArentFox Schiff LLP

(57)     ABSTRACT

The present invention concerns the field of microreaction devices and of micro-process engineering. It particularly involves devices having micro-channels (internal chambers of micrometric to submicrometric dimensions) for conveying chemical or biochemical mixtures and/or reactions. More specifically, such devices are optimized to achieve high temperature and pressure stresses (i.e. 500° C. and 500 bar). For observation and analysis purposes, the microreaction devices have a wide range of transparency in terms of wavelengths. The subject matter of the present invention relates to a microfluid or microreactor device made of transparent sapphire, preferably in the wavelength range of 150 to 6500 nm, its manufacturing method and to its use.

18 Claims, 10 Drawing Sheets

(52) U.S. Cl.
CPC ................. *B01J 2219/00819* (2013.01); *B01J 2219/0086* (2013.01); *B01J 2219/0099* (2013.01)

(58) Field of Classification Search
CPC ........ B01J 2219/0086; B01J 2219/0099; B01J 2219/00788; B01J 2219/00824; B01J 2219/00862
USPC ......................................................... 422/129
See application file for complete search history.

(56) References Cited

U.S. PATENT DOCUMENTS

2008/0230129 A1\* 9/2008 Davis .................. G05D 7/0186
137/597
2009/0311737 A1 12/2009 Laurie et al.

OTHER PUBLICATIONS

Jiang et al., "Study on the morphology and shape control of volcano-shaped patterned sapphire substrates fabricated by imprinting and wet etching", CrystEngComm, 2015, 17(16):3070-3075.
Chen et al., "Evolution of Bottom c-Plane on Wet-Etched Patterned Sapphire Substrate", CS Journal of Solid State Science and Technology, 2013, 2(9):R169-R171.
International Search Report and Written Opinion mailed, Jul. 1, 2021, for PCT/FR2021/050604.
French Search Report mailed, Nov. 17, 2020, for FR2003453.

\* cited by examiner

SAPPHIRE MICROREACTORS

CROSS-REFERENCE TO RELATED APPLICATIONS

This application is a National Stage Entry of International Application No. PCT/FR2021/050604, filed Apr. 7, 2021, which claims priority to FR Application No. 2003453, filed Apr. 7, 2020, the disclosures of each of which are hereby incorporated by reference in their entirety.

The present invention belongs to the field of microreaction devices and micro-process engineering. In particular, it concerns devices having micro-channels (internal chambers of micrometric to submicrometric dimensions) for conducting chemical or biochemical mixtures and/or reactions. More particularly, such devices are optimized to reach high temperature and pressure constraints (i.e. 500° C. and 500 bar). For observation and analysis purposes, microreaction devices have a wide range of transparency in terms of wavelengths.

The subject matter of the present invention relates to a microfluid or microreactor device made of transparent sapphire, preferably in the wavelength range of 150 to 6500 nm, its manufacturing process and its use.

A microreactor is a microfluid device comprising internal chambers of micrometric to submicrometric dimensions containing microvolumes of fluid in which a chemical or biochemical reaction can occur. The design and the geometry of the microfluid channels are flexible and allow to realize an optimized reactor in order to maximize the reaction and to obtain, as efficiently as possible, the desired product. There are currently different types of microreactors depending on the materials used and the working temperature and pressure ranges considered: —Transparent: made with polymers (for example PDMS—PolyDiMethylSiloxane, PMMA—PolyMethylMethAcrylate) or with glass, —Semi-transparent: made of a silicon part and a borosilicate part, and —Non-transparent: made of metal or ceramics.

Table 1 below gives examples of generally observed limits in terms of pressure and temperature for known transparent or semi-transparent microreactors:

| — | Microreactor | | |
|---|---|---|---|
| Parameters | Polymers | Glass-glass | Silicon-borosilicate |
| Pressure | <20 bar | <400 bar | <400 bar |
| Temperature | <100° C. | <150° C. | <400° C. |

The present invention relates to a microreactor whose operating characteristics in terms of pressure, temperature and chemical compatibility surpass all other known microreactor types. In terms of temperature, it exceeds polymer, silicon-borosilicate and glass-glass microreactors. In addition, its in-situ analysis range covers the ultraviolet to the infrared.

An object of the invention is thus a microreactor made of transparent sapphire, preferably in the wavelength range from 150 to 6500 nm.

An advantage of the microreactor according to the invention is that it consists essentially of sapphire.

Advantageously, the microreactor according to the invention is made of transparent sapphire, preferably in the wavelength range from 150 to 6500 nm, wherein the sapphire is mono-crystalline or polycrystalline, preferably mono-crystalline such that the c-plane is perpendicular to the microreactor surface.

In the context of the invention, a "microreactor" or "microfluid device" is defined as a confined on-chip device with channel dimensions generally ranging from 1 to 1,000 μm within which reactive or non-reactive fluids can flow. The many microfabrication techniques available today allow for varied and complex geometries. Microreactors are used for studies in the field of micro-process engineering, particularly in flow. Microreactors offer many advantages compared to conventional reactors, such as the improvement of transfer phenomena (heat, matter, . . . ) at small scales depending on the materials used.

It is meant by "sapphire", the crystalline form of alumina ($Al_2O_3$), which can be mono-crystalline or polycrystalline. Synthetic sapphire has properties that are compatible with extreme conditions of high temperature, high pressure, and particularly corrosive chemical environments. Sapphire is surpassed in hardness and scratch resistance only by diamond. Sapphire has a melting point of 2050° C. and has excellent thermal conductivity. Its mechanical and corrosion resistance, dimensional stability, resistance to extreme pressures and very high heat resistance make sapphire a material that stands out from advanced materials such as ceramics and glass. Moreover, the optical properties of sapphire are exceptional: it is transparent to light waves of lengths between 150 nm (ultraviolet) and 6500 nm (infrared).

Generally, a single crystal or monocrystalline material is a solid material consisting of a single crystal, formed from a single seed. In contrast, a polycrystal or polycrystalline material is made up of a multitude of small crystals of varying size, shape and orientation separated by grain boundaries.

Advantageously, according to the invention, the sapphire can be single-crystalline or polycrystalline. Preferably, the sapphire is mono-crystalline and the c-plane is perpendicular to the surface of the microreactor. (S. X. Jiang et al, Study on the morphology and shape control of volcano-shaped patterned sapphire substrates fabricated by imprinting and wet etching, *CrystEngComm*, 2015, 17, 3070-3075 and C. Chen et al, Evolution of Bottom c-Plane on Wet-Etched Patterned Sapphire Substrate, *CS Journal of Solid State Science and Technology*, 203, R169-R171).

It is meant by "transparent", a property of a material or device that allows light to pass through it in whole or in part. This property depends on the wavelength of the light, the nature of the material and the thickness to be passed through: for example, glass is transparent in the visible range and blocks certain ultraviolet rays. FIG. 1 shows the transmission diagram of a sapphire microreactor according to the invention whose total thickness (which is an assembly of two wafers) is 1 mm.

It is meant by "wafer", a very thin slice or plate of material used as a substrate for microfabrication. In the context of the invention, wafers are essentially made of sapphire.

Advantageously, the microreactor according to the invention may comprise a first wafer, a second wafer, at least one of said wafers comprising at least one micro-channel. The microreactor may be an assembly of multiple wafers (i.e. two or more). For example, FIG. 5 shows a microreactor comprising a first wafer (1), a second wafer (2), at least one of said wafers comprising at least one micro-channel (3).

Advantageously, the microreactor according to the invention does not comprise an intermediate layer (for example in elastomers—Nitrile, Buna-N, Viton or Kalrez), between the wafers, allowing or promoting the assembly of the wafers. Apart from any elements in contact with the microreactor, such as compression parts or seals (external to the reactor, connected to the microreactor inlets and outlets) or incorporated into the microreactor, such as in situ sensors (integrated into the micro-channels), the microreactor according to the invention is made only of sapphire.

Typically, a sapphire wafer can have a thickness ranging from 200 to 2000 μm. The traditional lateral dimensions of a microreactor are generally between 5 mm and several hundred millimeters.

Advantageously, the microreactor according to the invention, generally consisting of two superimposed wafers, can have a total thickness ranging from 400 μm to 4000 μm, preferably from 400 μm to 1000 μm. The dimensions of the microreactor (length, width, thickness), as well as the dimensions of the micro-channels, may vary depending on the intended application. For example, for material synthesis, a micro-channel width of 200 μm is generally used.

Advantageously, the microreactor according to the invention does not include an intermediate layer (of a material other than sapphire) between the two superimposed wafers.

Advantageously, the first and second wafers may have the same or different thicknesses. Preferably, the first and second wafers have the same thickness.

It is meant by "micro-channel", an etched channel with two of its dimensions being micrometer to submicrometer. A micro-channel may include at least one inlet and/or at least one outlet (also called an inlet or outlet port), etched or drilled into at least one wafer. A micro-channel may have a variable length and shape. A micro-channel may include one or more patterns. For example, a micro-channel may include one or more straight sections and/or include one or more boustrophedon, funnel, zigzag patterns or may include microplots and porous medium. A micro-channel may be branched or unbranched. A micro-channel may include one or more branches, such as when it includes multiple inlets and/or multiple outlets. A micro-channel is continuous. FIGS. 6, 7, and 8 show examples of micro-channel patterns.

Advantageously, the first and/or second wafer may include at least one micro-channel. A micro-channel may be etched into at least one wafer. A micro-channel may be etched into one wafer or into a plurality of wafers, preferably etched into one or two wafers. For example, the micro-channel is formed by etching into a first wafer and then overlaying it with the second wafer when the microreactor is assembled. When the micro-channel is etched into two wafers, the micro-channel is formed by etching into each of the first and second wafers, and then the top and bottom portions of the micro-channel are joined opposite each other when the microreactor is assembled. FIG. 2 shows a cross-sectional view of different types of micro-channels: micro-channels (A) and (C) are etched into two wafers; micro-channels (B) and (D) are etched into one wafer.

Advantageously, the at least one micro-channel may have an average depth ranging from 0.1 to 500 μm, preferably from 10 to 100 μm. The depth of a micro-channel may be variable or constant along the entire length of the micro-channel. Preferably, the depth of a micro-channel is constant along the entire length of the micro-channel. A micro-channel depth H is defined. When a micro-channel is etched into two wafers, the depth H may be the same or different in the two wafers. For example, FIG. 2 shows a micro-channel (A) etched with a greater depth in wafer (1) than in wafer (2). FIG. 2 shows a micro-channel (C) etched with identical depth in both wafers.

Advantageously, the at least one micro-channel may have a width ranging from 0.1 to 2000 μm, preferably from 100 to 400 μm. The width of the micro-channel may be variable or constant along the entire length of the micro-channel.

Preferably, the width of a micro-channel is constant along the entire length of the micro-channel. A micro-channel width W is defined. A micro-channel may have a top width Wp and a bottom width Ws between the top and bottom of the etch. The widths Wp and Ws can be the same as in FIG. 4 (for example in the context of a plasma etching) or different as in FIG. 3 (for example in the context of a chemical etching).

A wafer thickness/micro-channel depth ratio is defined. Advantageously, the wafer thickness/micro-channel depth ratio can be greater than or equal to 2, preferably greater than or equal to 4.

Advantageously, the microreactor according to the invention is configured in such a way that the total surface area developed by the micro-channel(s) as a whole is generally less than or equal to half the total surface area of the wafer. To avoid mechanical breakage of the material, the minimum distance between two micro-channels, or between two parts of the same micro-channel (for example when said micro-channel snakes) may be greater than or equal to the width of said micro-channel. Similarly, the minimum distance between a micro-channel and the end of a wafer may be greater than or equal to the width of said micro-channel.

Advantageously, the microreactor according to the invention may comprise a wafer (1) of thickness $t_p$ and a wafer (2) of thickness $t_s$, said wafer (2) comprising at least one micro-channel (3). The micro-channel (3) may be characterized by a depth H and a width W.

Advantageously, the minimum distance $Z_1$ between two micro-channels (3) can be greater than W, preferably greater than 2*W. Preferably, if $W_p \neq W_s$, the distance $Z_1$ is greater than the greater of: if $W_p > W_s$ then $Z_1 > W_p$, preferably $Z_1 > 2*W_p$; if $W_s > W_p$ then $Z_1 > W_s$, preferably $Z_1 > 2*W_s$.

Advantageously, the minimum distance $Z_2$ between a micro-channel (3) and the end of a wafer can be greater than W, preferably greater than 2*W. Preferably, if $W_p$ $W_s$, the distance $Z_2$ is greater than the greater of: if $W_p > W_s$ then $Z_2 > W_p$, preferably $Z_2 > 2*W_p$; if $W_s > W_p$ then $Z_2 > W_s$, preferably $Z_{2 > 2}*W_s$.

Advantageously, the microreactor according to the invention may have a volume of less than 500 μl, preferably ranging from 0.5 to 500 μl. By volume of the microreactor is meant the total volume constituted by all the micro-channels included in the microreactor. The volume of the microreactor may vary depending on the intended application. For example, the microreactor can have a volume ranging from 10 to 500 μl when it is intended to be used in chemical or materials synthesis. For example, the microreactor may have a volume ranging from 0.5 to 10 μl when the microreactor is intended to be used in thermo-hydrogeology. For example, the microreactor can have a volume ranging from 0.5 to 500 μl when it is intended to be used in microbiology under extreme conditions.

The invention also relates to the use of sapphire for the manufacture of a microreactor.

The invention also relates to a method of manufacturing a sapphire microreactor according to the invention comprising the steps: 1) etching at least one micro-channel on at least one wafer, 2) assembling the etched wafer obtained in step 1) on a second etched or unetched wafer.

Advantageously, step 1) of etching the micro-channel can be carried out by any technique known to the person skilled in the art.

Advantageously, step 1) of the process according to the invention can be performed by a photolithography method followed by etching (chemical or plasma).

Advantageously, step 1) of the process according to the invention can be carried out by a direct writing, laser or machining method.

Advantageously, step 1) of the process according to the invention may comprise the following sub-steps: a) printing an image of interest, by means of a resin, on at least one wafer, said wafer being covered by a layer of sacrificial material b) chemical etching of the sacrificial material layer c) removing the residual resin layer, d) etching the micro-channels.

Advantageously, the printing step a) of the process according to the invention may comprise the steps of: —covering the surface of the wafer and the layer of sacrificial material, comprising the use of a resin, —baking the resin, —placing a mask comprising an image of interest on the resin, —insolation of the areas not protected by the mask by UV irradiation, —revealing the image of interest by removing the insolated areas.

It is meant by "sacrificial material layer", a thin layer deposited on the surface of the sapphire wafer, which serves as protection and masking during the etching step. Advantageously, this layer consists of a silicon oxide layer with a thickness of 300 to 500 nm.

Advantageously, step b) of chemical etching of the process according to the invention may comprise an etching by means of a solution allowing the removal of the sacrificial layer present on the wafer.

Advantageously, the step c) of removing the residual resin layer can be done by means of a solvent (e.g. acetone).

Advantageously, step d) of chemical etching of the process according to the invention may comprise an etching of the wafer with a solution of sulfuric and phosphoric acid (ratio ranging from 3:1 to 4:1 by volume).

Advantageously, the process according to the invention can also include a step of removing the residual sacrificial layer by chemical etching (e.g. using a hydrofluoric acid solution).

Advantageously, the process according to the invention may further comprise a step of drilling the inlet and/or outlet ports of the wafer(s).

Advantageously, the assembly of step 2) of the process according to the invention may comprise a pre-bonding step. The pre-bonding step may comprise at least one wafer cleaning step followed by pre-bonding in aqueous solution and then heat treatment in a press system (and preferably under primary vacuum, from 10 to 100 mbar). The cleaning can be done for example with a solution of sulfuric acid ($H_2SO_4$) and hydrogen peroxide ($H_2O_2$), (4:1, v/v), followed by a rinsing (for example in ultra-pure water at a temperature higher than or equal to 60° C. and a treatment in a phosphoric acid crystallizer at a temperature higher than or equal to 150° C. The wafers can then be pre-bonded in a crystallizer.

Advantageously, the pre-bonding of the wafers can consist in bringing the wafers into contact with each other, with the etched side(s) on the inside, the assembly thus constituted then undergoing a heat treatment at a temperature ranging from 200 to 300° C. and for a period ranging from 2 to 4 hours in a press system (screw tightening), preferably under primary vacuum (that is to say from 10 to 100 mbar).

Advantageously, the pre-bonding of the wafers is performed in a clean room. The wafers are brought into contact with each other in an enclosure, compressed via a press (between 2 and 20 bar of pressure), heated (from 200 to 300° C.) and then, preferably, placed under a primary vacuum (10-100 mbar) for the duration of the pre-bonding, using a vacuum pump.

Advantageously, the assembly step 2) of the process according to the invention can be carried out by any known methods. In particular, it can be performed by Spark Plasma Sintering (SPS), also known as Field Activated Sintering Technique (FAST).

The invention also relates to the use of a microreactor according to the invention for the implementation of high pressure and/or high temperature fluids, chemically aggressive fluids (acids, super acids, bases or any corrosive fluid) and supercritical fluids in the fields of synthetic chemistry, thermo-hydrogeology, geochemistry, microbiology under extreme conditions (T<1000° C., p<2000 bar), preferably at temperatures lower than or equal to 500° C. and/or pressures lower than or equal to 500 bar.

Figure 6:
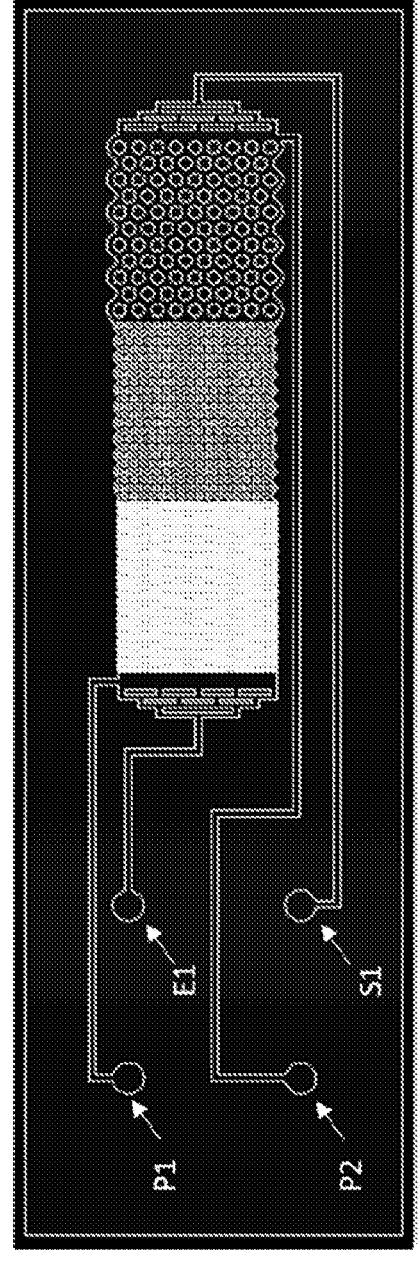
Figure 6:
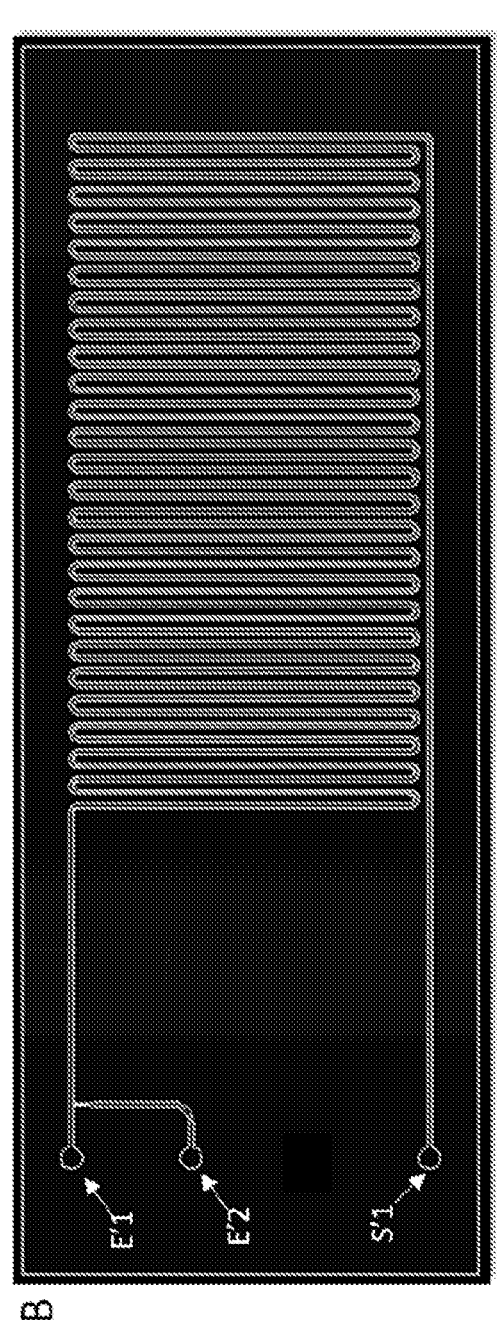

FIG. 6 shows two examples of patterns (A) and (B). Pattern (A) represents a "porous medium" type microreactor composed of microplots with different diameters. The pattern (A) has an inlet E1 and an outlet S1 as well as two ports P1 and P2 allowing the pressure to be measured upstream and downstream of the micro-plots. Pattern (B) represents a "segmented flow" microreactor composed of two inlets E'1 and E'2 and an outlet S'1. The two micro-channels connected to the inlets E'1 and E'2 join to form a single channel that continues to have a certain length of channel up to the outlet S'1.

Figure 4:
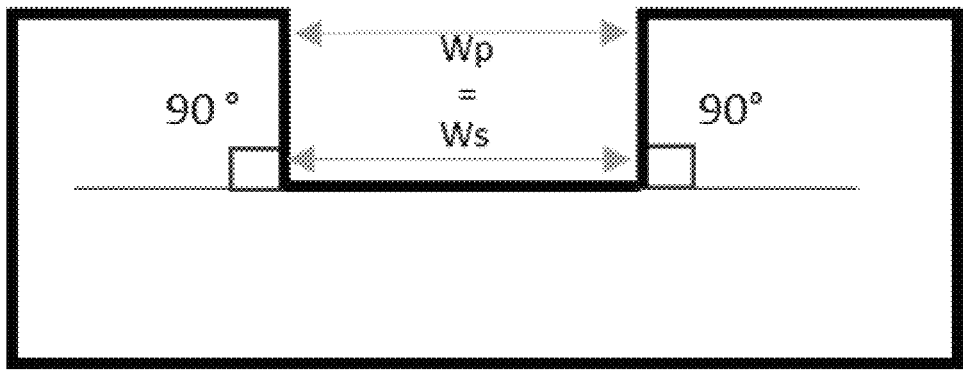
FIG. 4 shows a cross-sectional view of a wafer comprising a plasma etched micro-channel.
Figure 5:
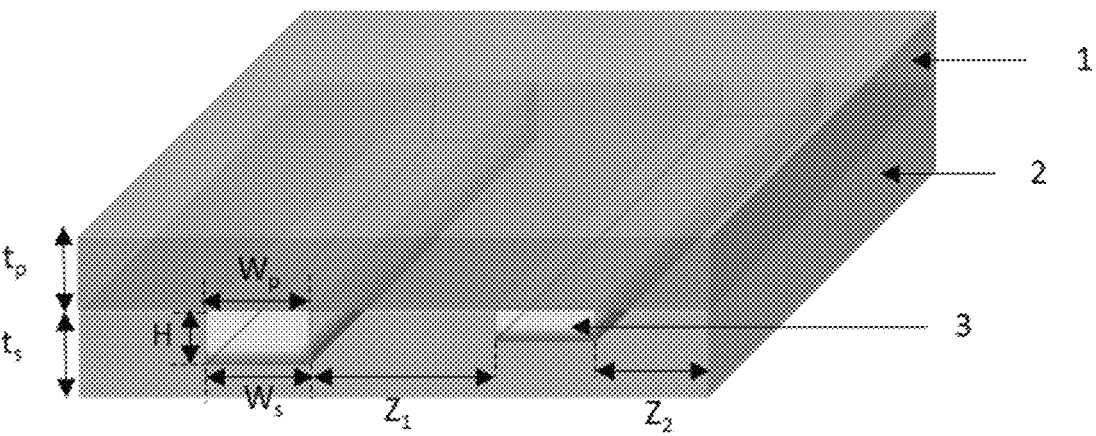
FIG. 5 shows a cross-sectional view of a microreactor according to the invention comprising a first wafer (1), a second wafer (2) and a micro-channel (3).
Figure 7:
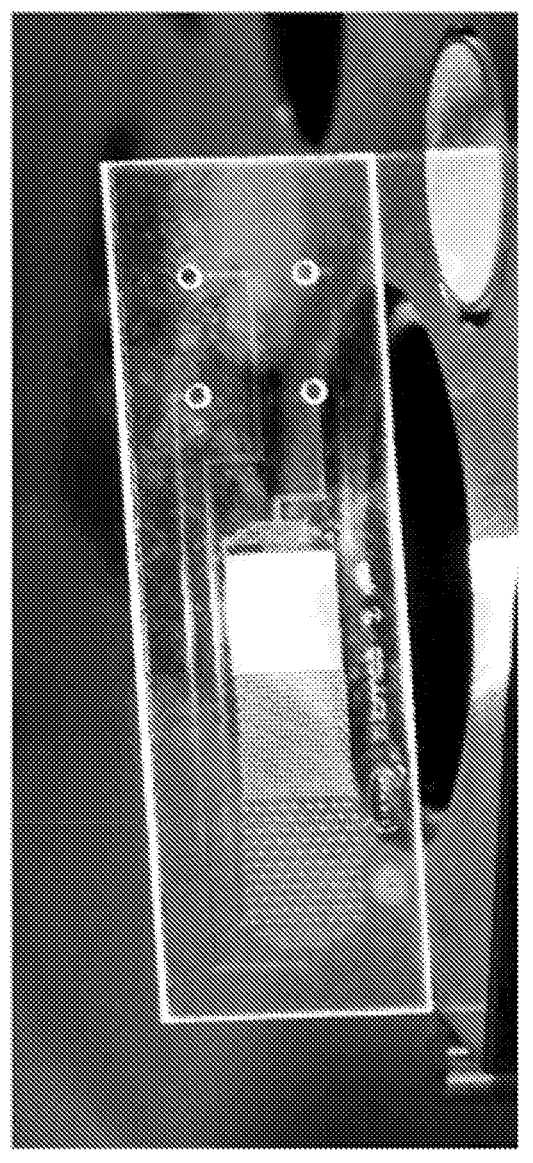
Figure 7:
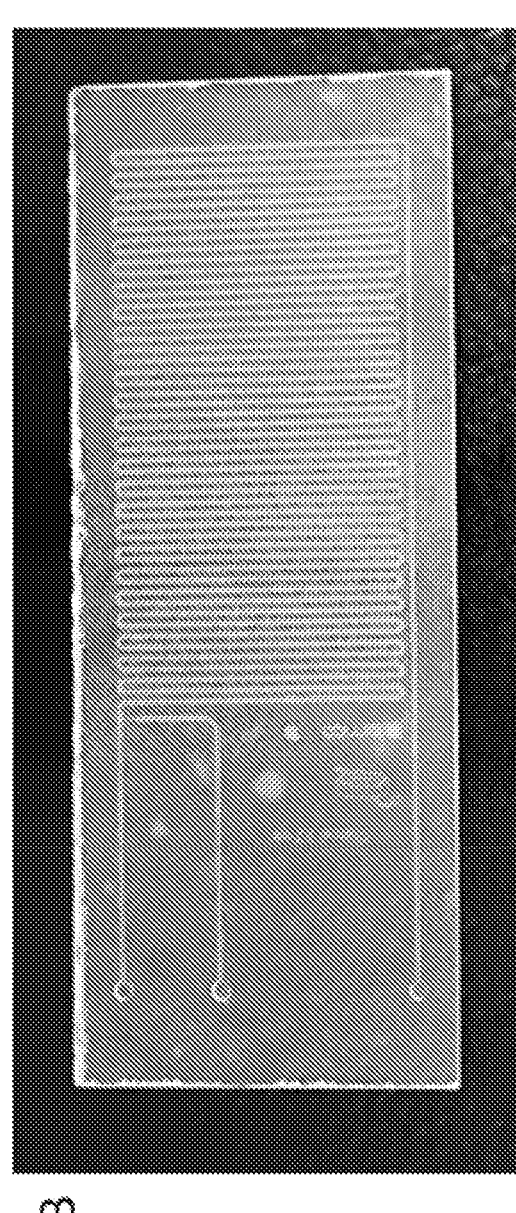

FIG. 7 shows (A) the microreactor C obtained in Example 1 with the porous medium type pattern A of FIG. 4 and (B) a microreactor with the segmented flow type pattern B of FIG. 4 (fluid alternations).

Figure 8:
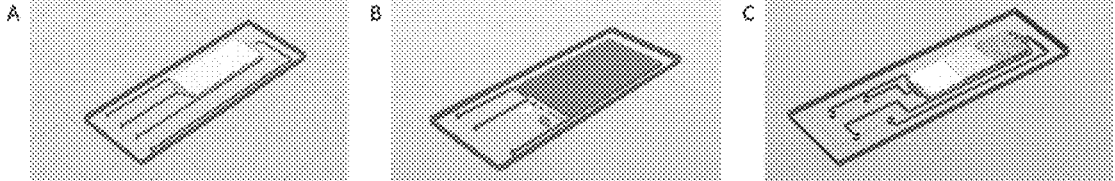

FIG. 8 represents in 3D modeling, two patterns (A and C) of microreactor of porous medium type with (A) a uniform porous medium (identical diameter of the micro-plots) and (C) a porous medium composed of micro-plots having three different diameters. FIG. 8 shows a 3D model of a segmented flow pattern (B).

Figure 9:
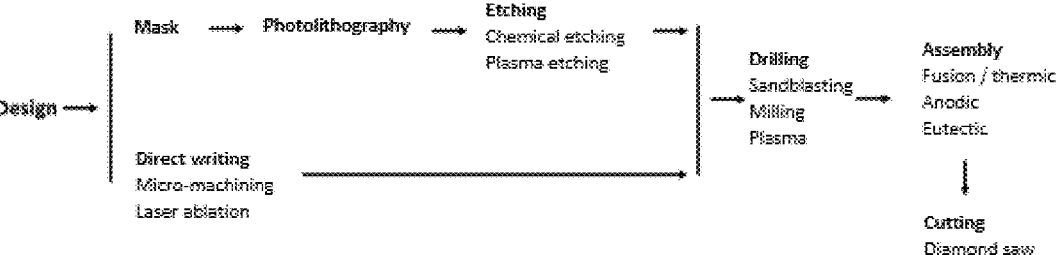

FIG. 9 shows schematically the main steps in the manufacture of a microreactor according to the invention.

Figure 10:
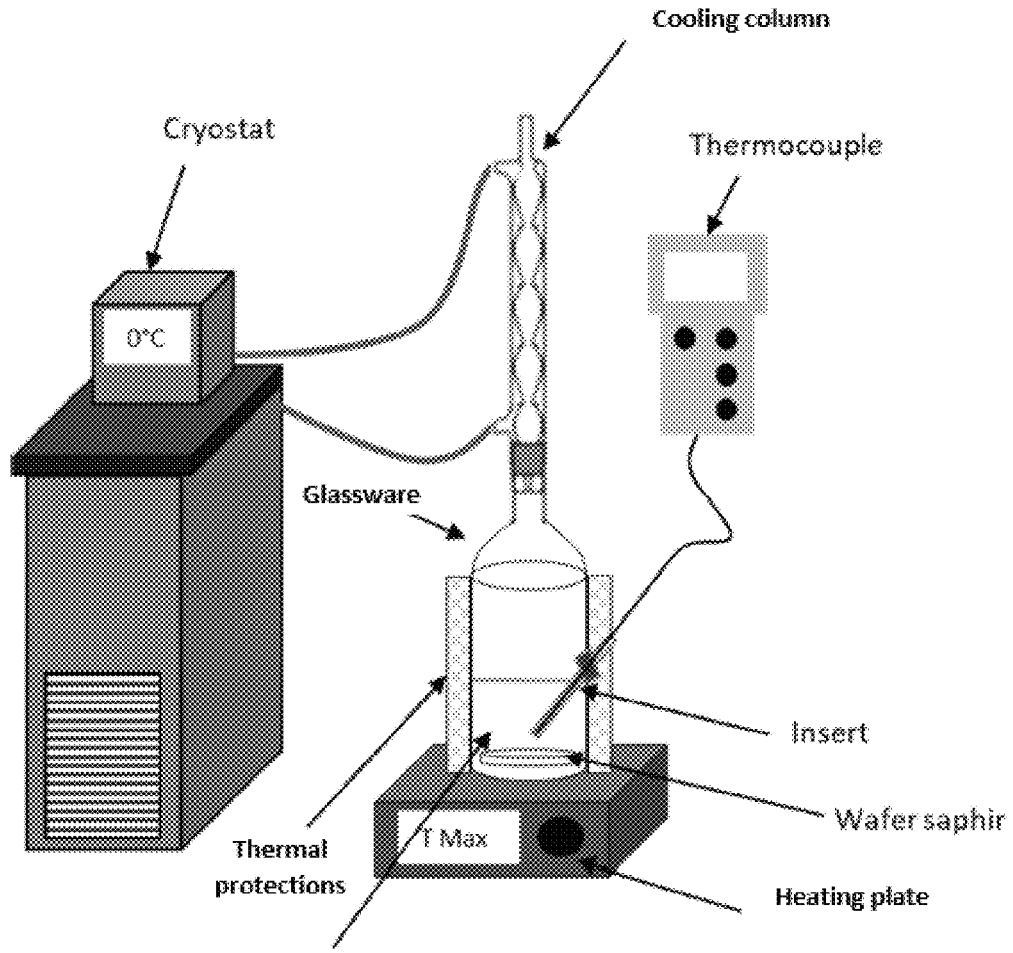

FIG. 10 shows the device set up for chemical etching.

Figure 11:
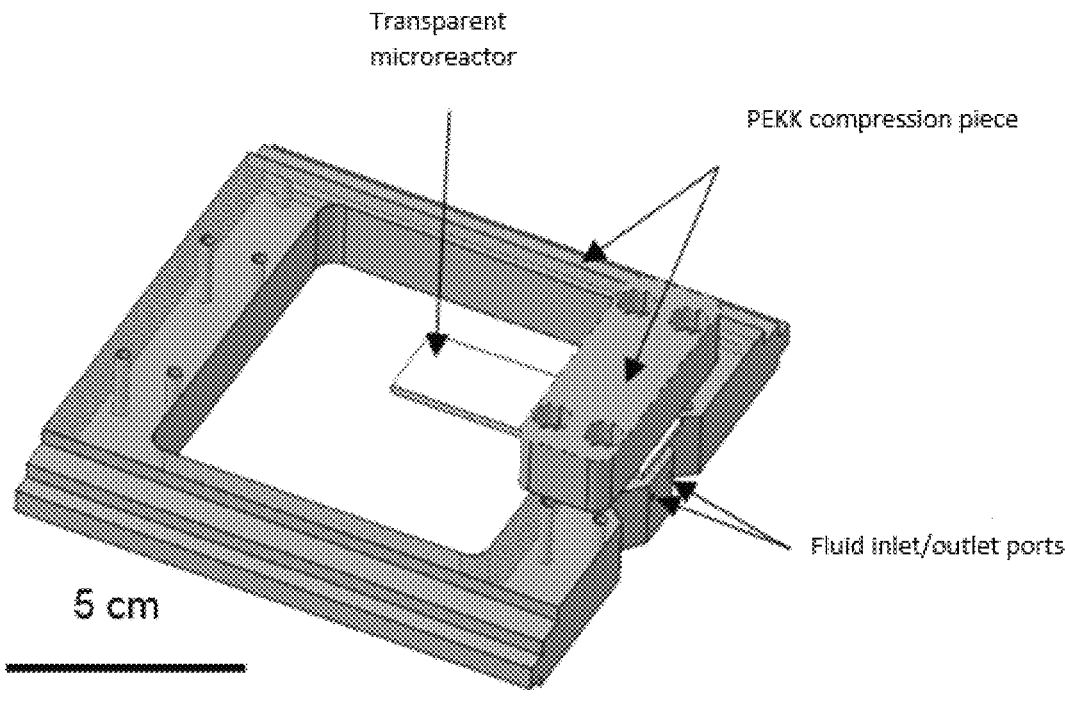

FIG. 11 shows an injection system, also known as a compression piece, which connects the microreactor inlets and outlets to reagents. This injection system keeps the microreactor under pressure.

Figure 12:
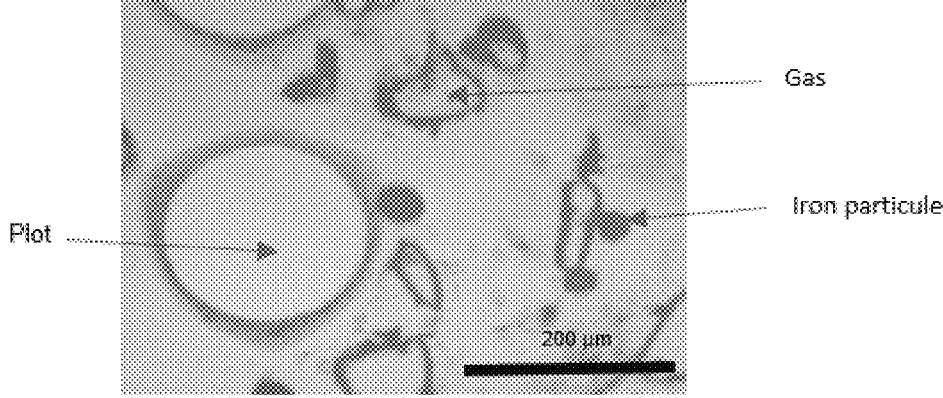

FIG. 12 shows a photograph taken by optical microscopy (×40 objective) of the interior of an all-sapphire microreactor under pressure during a reaction between water, iron particles and a gas.

Figure 13:
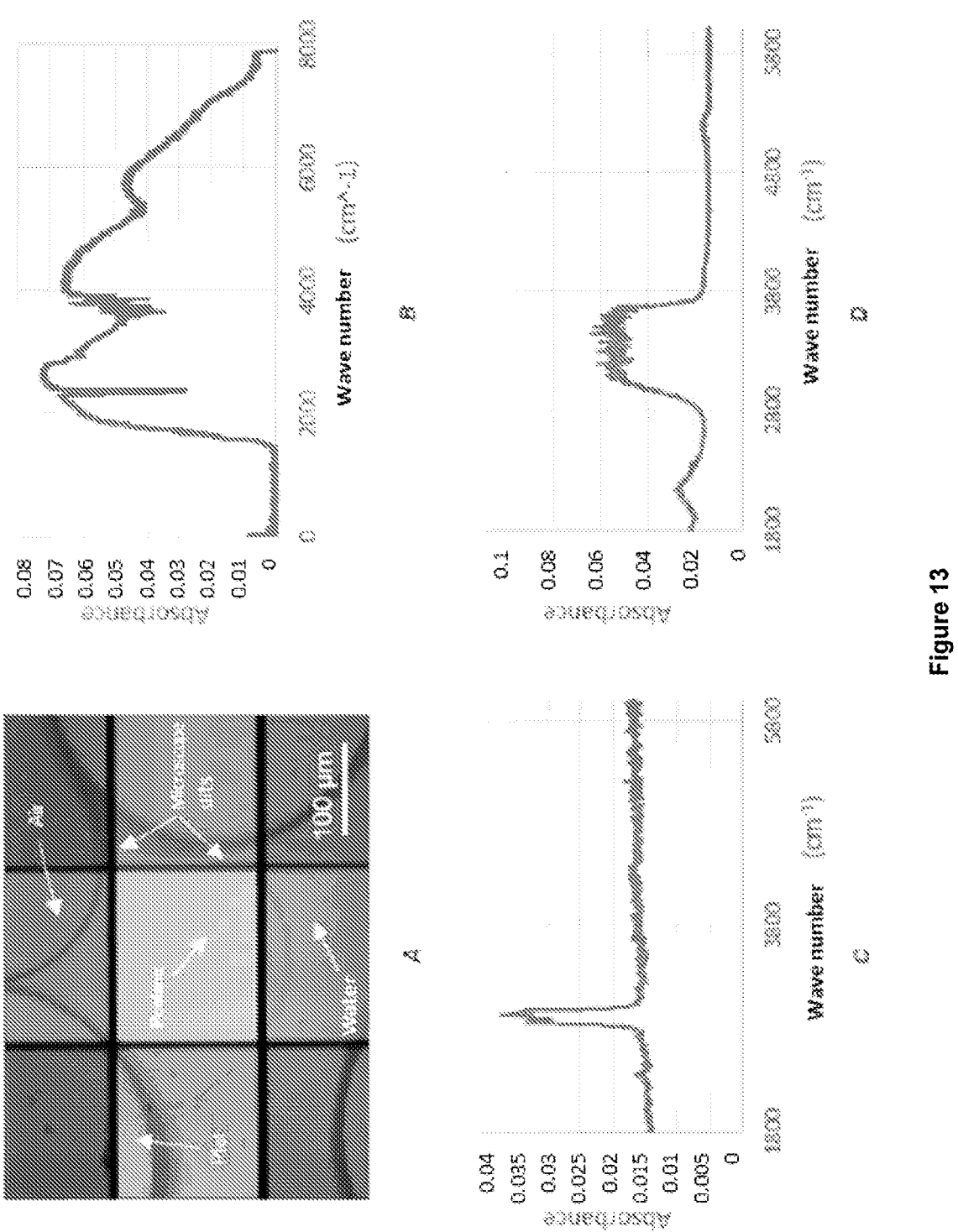

FIG. 13 shows in (A) the image obtained by optical microscopy (×15 objective) during an in situ infrared spectroscopy analysis of a microreactor filled with a water/pentane/air mixture; in (B) the absorption spectrum of the all-sapphire microreactor used as a background for the in situ analyses; in (C) and (D) respectively, the absorption spectra of pentane and water obtained by infrared spectroscopy on the microreactor.

Figure 14:
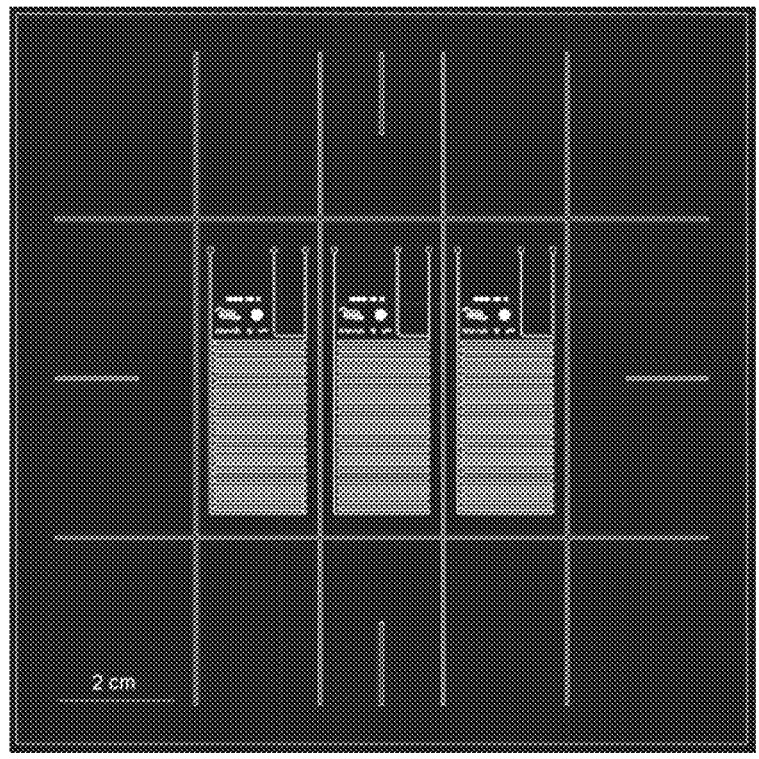

FIG. 14 represents a mask made with AUTOCAD software (registered trademark) containing the image of interest or design to be etched in the wafer.

Figure 15:
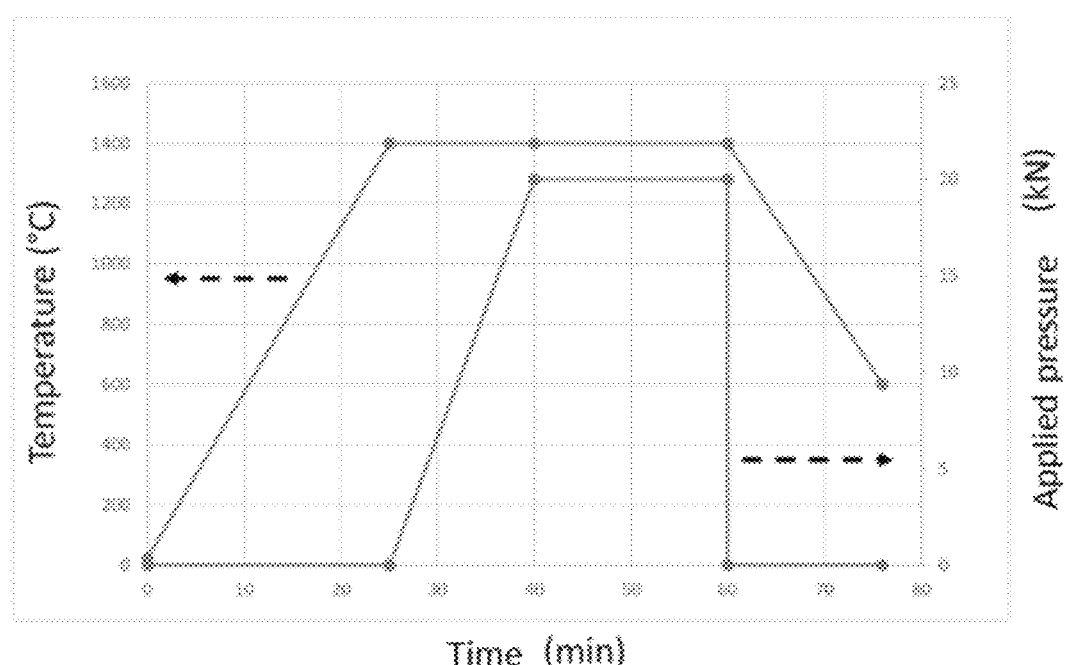

FIG. 15 shows the parameters used in the Spark Plasma Sintering assembly step, specifically the temperature and pressure ramps applied as a function of time.

Figure 16:
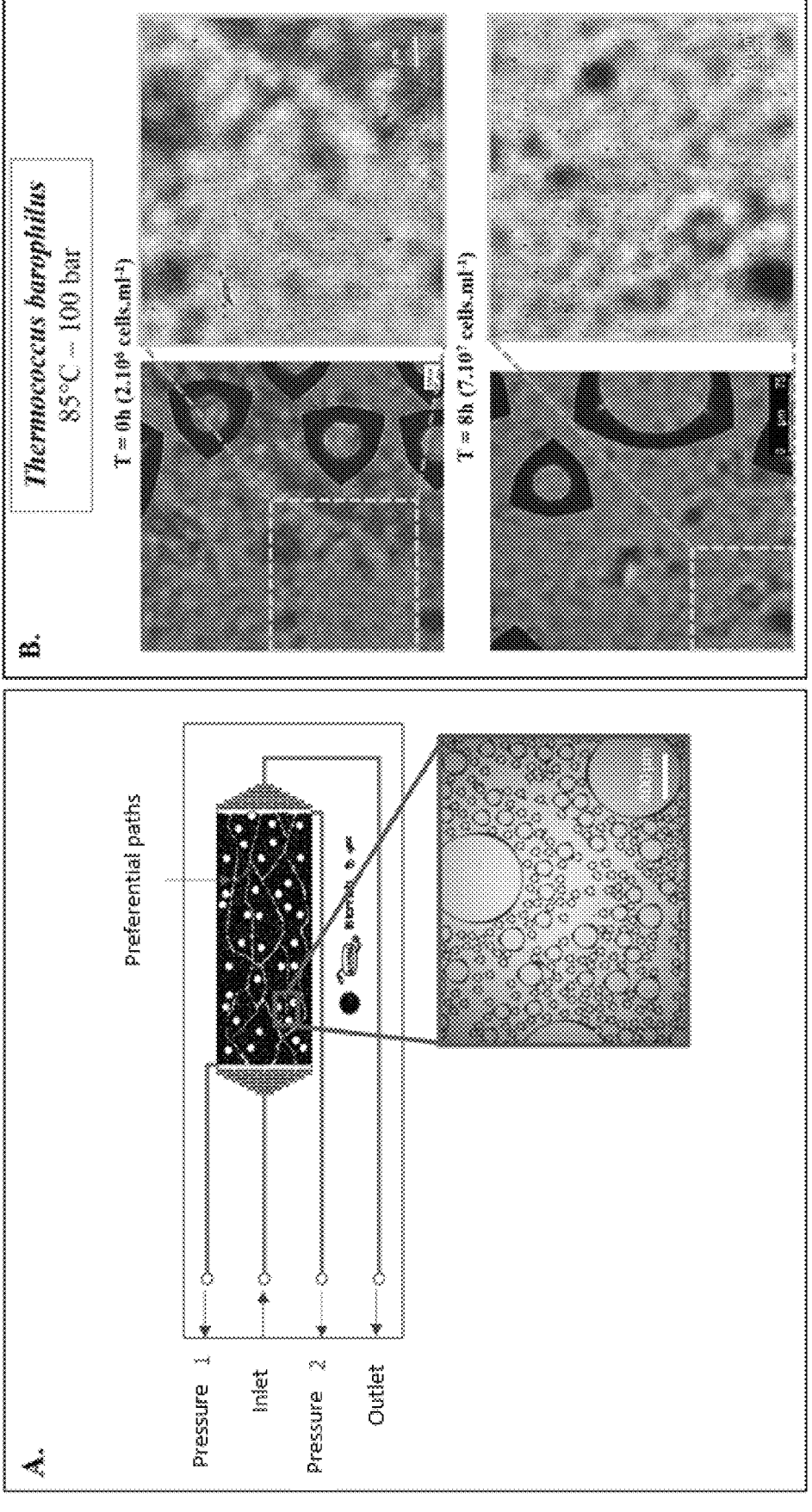

FIG. 16 shows: (A) a sapphire microreactor pattern that has an inlet and an outlet as well as two ports P1 and P2 allowing the pressure upstream and downstream of the micro-plots to be measured, said pattern simulating a heterogeneous porous medium with different sized pads (25 to 300 μm) as well as preferential passage areas simulating cracks. (B) visible light images at different growth times (0 and 8 h) of microorganisms of the strain *Thermococcus Barophilus* that were grown under pressure (100 bar)/temperature (85° C.) in a microreactor having the design of FIG. 16-A. It is possible to follow the evolution of the microbial development in real time.

The invention will be better understood by reading the following non-limiting examples.

EXAMPLE 1: MANUFACTURE OF A SAPPHIRE MICROREACTOR ACCORDING TO THE INVENTION

1) Etching.

The pattern of a micro-channel (previously drawn on a mask via AUTOCAD software (trademark), see FIG. 14) is printed on the sapphire wafer by the photolithography process.

This step is preferably performed in a clean room (clean room according to ISO 14644-1). A sapphire wafer of 101.6 mm diameter (wafer), covered with a 500 nm $SiO_2$ oxide layer, is cleaned with isopropanol and ethanol and then dried with a microfiber cloth, in order to remove all dust/traces from the surface. The lithography process starts with the uniform application of a film of a few μm thickness of photosensitive resin (advantageously: 4 μm), on the substrate via the use of a spin coating device. A baking step on a hot plate follows the resin deposition (the temperature and the duration are to be adapted according to the resin, in this example the baking was 5 minutes at 115° C.). Once the wafer has cooled down to room temperature, the resin is exposed for 45 seconds to ultraviolet rays in an exposing aligner (for example type UV-KUB KLOE). When the wafer is placed in this apparatus, a mask is placed on top so that the mask patterns are positively formed on the resin.

The wafer is then immersed in a chemical developer bath containing a diluted solution of tetramethylammonium hydroxide which removes the insolated areas. These areas are no longer protected by the resin and will therefore be sensitive to etching. To stop the development of the resin, the wafer is then rinsed with water and dried before being heated for a few minutes on a hot plate (about 6 minutes at 115° C.).

The oxide layer, exposed after irradiation of the resin, is removed by acid etching. The wafer is placed, with the side to be etched facing upwards, in a Teflon crystallizer and the area to be etched is covered with a 1% hydrofluoric acid (HF) solution buffered in water for 7 minutes. Once the chemical etching is complete, the wafer is rinsed with water and the final design imprint appears. The residual resin layer is removed by cleaning the wafer with acetone.

Once the oxide layer has been removed, the sapphire is etched. The etching is done with sulfuric acid ($H_2SO_4$) and phosphoric acid ($H_3PO_4$) in the proportions 4 to 1 (v/v), following the set-up shown in FIG. 10. The temperature of the mixture stabilizes between 250 and 300° C. After several minutes at the maximum temperature, the wafer is etched to form the desired micro-channel pattern. Since the wafer etch is anisotropic, the etch profile is along the c-plane of the sapphire, making asymmetric angles 0=35° and 70° to the surface. Once etched, the wafer is rinsed with water and ethanol.

The inlet and outlet ports of the wafer are drilled, for example with a laser or by using diamond drill bits. A final HF bath (7 min) is performed to remove the residual oxide layer.

We obtain the wafer A.

2) Assembly.

The wafer pre-bonding step is performed in clean condition (clean room) to avoid any dust or impurities to be placed between the two wafers and compromise the assembly. The two wafers, wafer A and a wafer B (preferably of the same lateral dimensions as wafer A) are cleaned with a Piranha solution (sulfuric acid ($H_2SO_4$) and hydrogen peroxide ($H_2O_2$, 4:1 v/v) for 15 min. Then the two wafers are placed for 5 min in ultra pure water heated to 60° C. and transferred to a phosphoric acid crystallizer heated to 150° C. After 30 minutes, both wafers are placed in a dilute sulfuric acid solution with a pH of 1 for 5 min. The wafers are then placed in a crystallizer containing ultra pure water for 5 minutes.

The two wafers are then assembled one against the other, the etched side(s) on the inside. The set thus constituted is then heat treated at 200° C. for 2 hours in a press system (screw tightening).

The assembly of the wafers is carried out by Spark Plasma Sintering (SPS), also called Field Activated Sintering Technique (FAST). The parameters are shown in FIG. 15, which specifies in particular the temperature and pressure ramps applied as a function of time to ensure good assembly.

Once the two wafers are bonded, the microreactor is cut by a diamond saw to obtain the microreactor C, depending on the dimensions of the pattern and the application envisaged for the thickness.

EXAMPLE 2: EXAMPLE OF THE USE OF THE MICROREACTOR C OF EXAMPLE 1 UNDER SEVERE CONDITIONS, PRESSURE AND TEMPERATURE TEST AND IN SITU ANALYSIS

The microreactor in Example 1 is used for microbiology under extreme conditions.

The microreactor C of Example 1 is connected to a fluid injection system suitable for high pressure and high temperature conditions. FIG. 11 shows the three-dimensional drawing of the PEEK (polyetheretherketone) compression piece developed for these microreactors.

Pressure and Room Temperature Test of the Microreactor C.

To test the microreactor C in pressure, it is attached to the compression piece and connected to an ISCO Teledyne pump filled with water. The microreactor C has a pressure resistance of 400 bar under the conditions of the example.

Temperature and Atmospheric Pressure Test of the Microreactor C.

To test the microreactor C in temperature, it underwent a local temperature gradient: 400° C. at one end and 11.3° C.

at the other. After several hours under this temperature gradient, the microreactor remained intact (no cracks, breaks or other changes).

It is thus demonstrated that the microreactor according to the invention can withstand the severe conditions according to the example of temperature and pressure tests described above.

In Situ Analysis in the Microreactor C.

Figure 1:
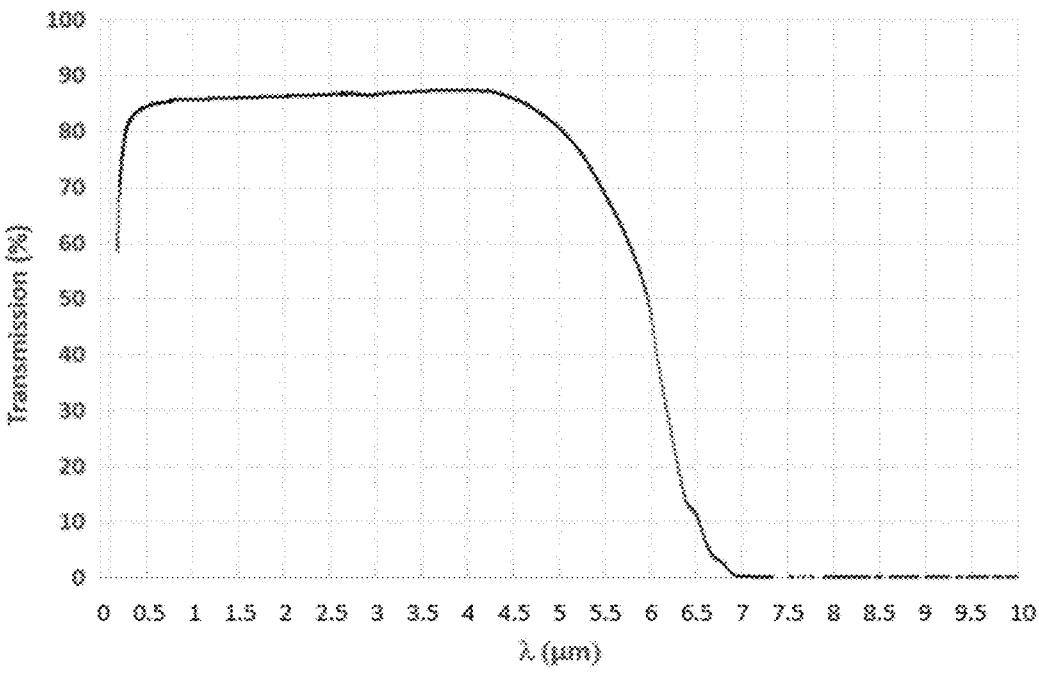
FIG. 1 shows the transmission diagram of a sapphire microreactor according to the invention with a total thickness of 1 mm (transmission in % as a function of wavelength $\lambda$ in µm).
Figure 2:
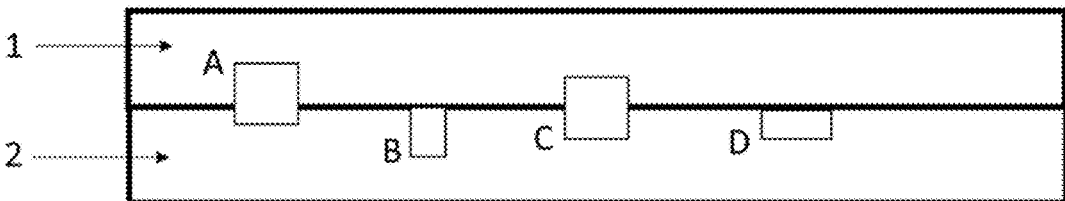
FIG. 2 shows a cross-sectional view of micro-channels etched into two wafers (A and C) and micro-channels etched into a single wafer (B and D).
Figure 3:
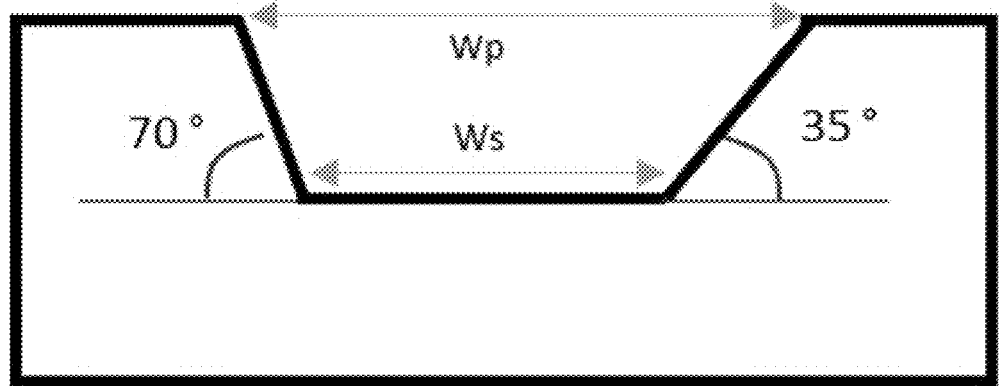
FIG. 3 shows a cross-sectional view of a wafer comprising a chemically etched micro-channel.

Microreactor C is transparent over a very wide wavelength range: from infrared to ultraviolet. FIG. 1 shows a transmission spectrum of a sapphire microreactor as a function of wavelength. This characteristic allows to realize observations or analyses (FIG. 13) with for example an optical microscope or an infrared spectrometer.

Analysis by Optical Microscopy.

By optical microscopy, it is possible to observe in real time the reactions that occur inside the microreactors.

Analysis by Infrared Spectroscopy.

An in situ analysis of a microreactor C was performed using an infrared spectrometer equipped with a microscope (see FIG. 13A). First, the absorption spectrum of sapphire (visible in FIG. 13B) was made. This spectrum was used as a background to perform analyses. Next, we injected a water-pentane mixture into the microreactor. The absorption spectra of these two molecules are shown in FIGS. 13C and 13D.

These tests and analyses show that it is possible to follow in real time a reaction performed in an all-sapphire microreactor under pressure and temperature via in situ analysis techniques. For example, FIG. 12 shows an image obtained by optical microscopy of the interior of a microreactor (pattern with microdots) housing a reaction between water, $CO_{2(g)}$ and iron particles. One of the products of this reaction ($FeCO_3$) can be identified by infrared spectroscopy.

EXAMPLE 3: EXAMPLE OF THE USE OF A SAPPHIRE MICROREACTOR TO MONITOR THE GROWTH OF EXTREMOPHILIC MICROBIAL STRAINS IN SITU AND IN REAL TIME

A sapphire microreactor was fabricated according to Example 1 with the pattern shown in FIG. 16-A.

The microreactor has been used for the study and cultivation of living microorganisms under extreme conditions, in particular microorganisms from deep ocean environments (i.e. *Thermococcus barophilus*).

This made it possible to perform in situ and real-time microbial growth monitoring for pressures up to 400 bar and temperatures <100° C. The microreactor pattern used for this study is shown in FIG. 16-A.

The microreactor is filled with a culture medium inoculated with the strain to be studied. This medium is then pressurized and placed in temperature conditions allowing the development of the microorganisms with the help of a heating element in direct contact with the microreactor. The microreactor is placed under a confocal microscope to perform in situ and real time imaging to follow the growth of the microorganisms.

FIG. 16-B shows visible light images at different growth times (0 and 8 h) of microorganisms of the *Thermococcus Barophilus* strain that were grown under pressure (100 bar)/temperature (85° C.) on a microreactor with the design shown in FIG. 16-A. It is thus possible to follow the evolution of microbial development in real time.

The invention claimed is:

1. A microreactor made of transparent sapphire in the wavelength range from 150 to 6500 nm, wherein the sapphire is mono-crystalline and the c-plane is perpendicular to the microreactor surface.

2. The microreactor according to claim 1, further comprising a first wafer and a second wafer, wherein at least one of said wafers comprises at least one micro-channel.

3. The microreactor according to claim 2, wherein the micro-channel has an average depth H ranging from 0.1 to 500 μm.

4. The microreactor according to claim 2, wherein the micro-channel has an average width W ranging from 0.1 to 1000 μm.

5. The microreactor according to claim 2, wherein the ratio of wafer thickness/micro-channel depth is greater than or equal to 2.

6. The microreactor according to claim 4, wherein the total surface area of the at least one micro-channel, is less than or equal to half of the total wafer surface area.

7. The microreactor according to claim 1, having a volume of less than 500 μl.

8. The microreactor according to claim 2, wherein the ratio of wafer thickness/micro-channel depth is greater than or equal to 4.

9. The microreactor according to claim 4, wherein the minimum distance Z between two micro-channels, or between two parts of the same micro-channel is greater than or equal to W.

10. The microreactor according to claim 1, having a volume ranging from 0.5 to 500 μl.

11. A process of manufacturing a sapphire microreactor according to claim 1, comprising the steps of:
   1) Etching at least one micro-channel on at least one wafer, and
   2) assembling the etched wafer obtained in step 1) on a second etched or unetched wafer.

12. The process according to claim 11, wherein the etching step 1) further comprises the substeps of:
   (a) printing an image of interest, by means of a resin, on at least one wafer, said wafer being covered by a layer of sacrificial material,
   (b) chemical etching of the layer of sacrificial material present on the wafer,
   (c) removing the residual resin layer, and
   (d) chemical etching of the micro-channels according to the desired final depth.

13. The process according to claim 11, further comprising a step of drilling the inlet and/or outlet ports of the wafer(s).

14. The process according to claim 11, wherein the assembly of step 2) further comprises a pre-bonding step, wherein said pre-bonding step comprises at least one wafer cleaning step followed by pre-bonding in aqueous solution and then heat treatment in a press system.

15. The process according to claim 14, wherein the cleaning step is carried out by means of a solution of sulphuric acid ($H_2SO_4$) and hydrogen peroxide ($H_2O_2$), (4:1, v/v), followed by a rinsing with ultra-pure water at a temperature higher than or equal to 60° C. and a treatment in a phosphoric acid crystallizer at a temperature higher than or equal to 150° C.

16. The process according to claim 14, wherein the pre-bonding consists of bringing the wafers into contact with each other, with the etched side(s) on the inside, the set thus constituted is then heat treated at a temperature ranging from 200 to 300° C. and for a time ranging from 2 to 4 hours in a press system.

17. The process according to claim 11, wherein the assembly of step 2) is performed by the Spark Plasma Sintering (SPS) or Field Activated Sintering Technique (FAST) method.

18. The method of claim 11, wherein the etching is done by a photolithography method followed by chemical or plasma etching, or by direct laser writing method or machining.

\* \* \* \* \*